(12) United States Patent
Chevallier et al.

(10) Patent No.: US 11,488,545 B2
(45) Date of Patent: Nov. 1, 2022

(54) DEVICE FOR DISPLAYING IMAGES COMPRISING TWO MODULATION STAGES

(75) Inventors: Louis Chevallier, La Meziere (FR);
Jean-Ronan Vigouroux, Rennes (FR);
Jonathan Kervec, Paimpont (FR);
Pascal Benoit, Liffre (FR)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 3624 days.

(21) Appl. No.: 12/452,052

(22) PCT Filed: Jun. 10, 2008

(86) PCT No.: PCT/EP2008/057242
§ 371 (c)(1),
(2), (4) Date: Sep. 23, 2011

(87) PCT Pub. No.: WO2008/155265
PCT Pub. Date: Dec. 24, 2008

(65) Prior Publication Data
US 2012/0113152 A1  May 10, 2012

(30) Foreign Application Priority Data
Jun. 13, 2007 (FR) ..................... 0755743

(51) Int. Cl.
*G09G 3/34* (2006.01)
*G09G 3/36* (2006.01)

(52) U.S. Cl.
CPC ......... *G09G 3/3426* (2013.01); *G09G 3/3413* (2013.01); *G09G 3/3433* (2013.01);
(Continued)

(58) Field of Classification Search
CPC ......... G09G 3/3406–3426; G09G 3/36; G09G 2320/0242; G09G 2320/0271; G09G 2320/0646; G09G 2320/0209
See application file for complete search history.

(56) References Cited

U.S. PATENT DOCUMENTS 5,839,823 A   11/1998 Hou
6,608,614 B1   8/2003 Johnson
(Continued)

FOREIGN PATENT DOCUMENTS

CN   1431539 A   7/2003
CN   1570733 A   1/2005
(Continued)

OTHER PUBLICATIONS

Helge Seetzen et al: "Self-calibrating wide color gamut high dynamic range display" Proc SPIE Int Soc Opt Eng; Proceedings of the SPIE—The International Society for Optical Engineering; Proceedings of SPIE—Is and T Electronic Imaging-Human Vision and Electronic Imaging XII 2007, vol. 6492, Feb. 12, 2007, XP002454790.
(Continued)

*Primary Examiner* — Gene W Lee
(74) *Attorney, Agent, or Firm* — Invention Mine LLC

(57) ABSTRACT

Device comprising:
a rear panel comprising a network of backlighting elements,
a front panel comprising a network of optical valves which are each capable of modulating the brightness of a single primary colour.
By the modulation of chrominance which is added to the modulation of luminance for the backlighting elements of the rear panel, the device according to the invention makes it possible to display the images with even more contrast and
(Continued)

Figure 1:
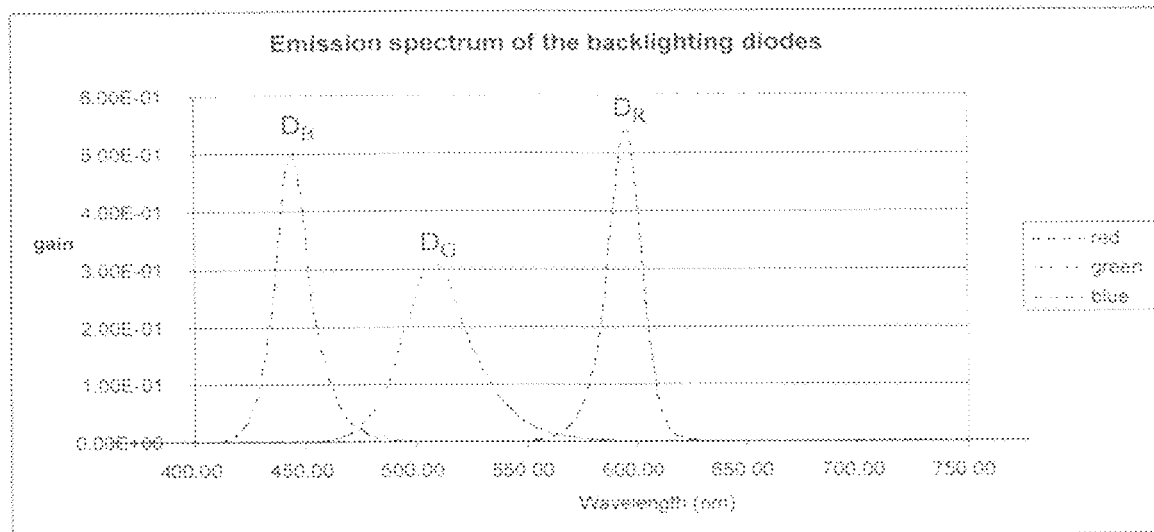

better quality. A specific control mode makes it possible to avoid the colour "interferences".

13 Claims, 2 Drawing Sheets

(52) U.S. Cl.
CPC ....... *G09G 3/36* (2013.01); *G09G 2320/0209* (2013.01); *G09G 2320/0242* (2013.01); *G09G 2320/0271* (2013.01); *G09G 2320/066* (2013.01); *G09G 2320/0646* (2013.01); *G09G 2320/0666* (2013.01); *G09G 2360/16* (2013.01)

(56) References Cited

U.S. PATENT DOCUMENTS

| | | | |
|---|---|---|---|
| 7,012,382 | B2 | 3/2006 | Cheang |
| 7,339,332 | B2* | 3/2008 | Cull .................... G09G 3/3413 315/307 |
| 2003/0090455 | A1 | 5/2003 | Daly |
| 2005/0174318 | A1 | 8/2005 | Chou |
| 2005/0231457 | A1 | 10/2005 | Yamamoto et al. |
| 2005/0242742 | A1 | 11/2005 | Cheang |
| 2005/0259439 | A1* | 11/2005 | Cull .................... G09G 3/3413 362/612 |
| 2005/0264702 | A1 | 12/2005 | Yoshii |
| 2006/0109398 | A1 | 5/2006 | Xiang-Dong |
| 2006/0125773 | A1 | 6/2006 | Ichikawa |
| 2006/0139289 | A1* | 6/2006 | Yoshida ................. G09G 3/342 345/98 |
| 2006/0145979 | A1 | 7/2006 | Lee |
| 2006/0244879 | A1 | 11/2006 | Yoon |
| 2006/0262078 | A1 | 11/2006 | Inuzuka et al. |
| 2006/0279522 | A1* | 12/2006 | Kurihara ............... G09G 3/3426 345/102 |
| 2007/0052036 | A1* | 3/2007 | Luan ................ H01L 21/823842 257/369 |
| 2007/0274093 | A1* | 11/2007 | Haim ................. G02F 1/133603 362/561 |
| 2008/0151139 | A1* | 6/2008 | Lynam ................. G09G 3/3426 349/62 |

FOREIGN PATENT DOCUMENTS

| | | |
|---|---|---|
| EP | 0881427 A1 | 12/1998 |
| EP | 1650730 A1 | 4/2006 |
| GB | 401064 | 11/1933 |
| JP | H11231131 A | 8/1999 |
| JP | 2001142409 A | 5/2001 |
| JP | 2002287686 A | 10/2002 |
| JP | 2004235103 A | 8/2004 |
| JP | 2004295080 A | 10/2004 |
| JP | 2005309338 A | 11/2005 |
| JP | 2006292914 | 10/2006 |
| JP | 2006310319 A | 11/2006 |
| JP | 2006323130 | 11/2006 |
| WO | 9738347 A1 | 10/1997 |
| WO | WO 02/079862 | 10/2002 |
| WO | 33077013 A2 | 9/2003 |
| WO | 2006010249 A1 | 2/2006 |

OTHER PUBLICATIONS

H. Seetzen et al; "54.2: A High Dynamic range Display Using Low and High Resolution Modulators" 2003 SID International Symposium Digest of Technical Papers. Baltimore, MD, May 20-22, 2003, San Jose, CA, vol. XXXIV, No. 1, May 20, 2003, pp. 1450-1453, XP007008386.
Search Report dated Aug. 28, 2008.

* cited by examiner

DEVICE FOR DISPLAYING IMAGES COMPRISING TWO MODULATION STAGES

This application is a national stage application under 35 U.S.C. § 371 of International Application PCT/EP2008/057242, filed Jun. 10, 2008, which was published in accordance with PCT Article 21(2) on Dec. 24, 2008 in French and which claims the benefit of French patent application No. 0755743, filed Jun. 13, 2007.

The invention relates to a device for the display of images with the aid of different primary colours, comprising:
- a rear panel comprising a network of backlighting elements which have modulatable luminance,
- a front panel comprising a network of optical valves which are each capable of modulating the brightness of a single primary colour and which are distributed in the form of elementary sets of adjacent optical valves, where each set comprises at least one optical valve for each of the said primary colours,
- and means for the optical coupling of each backlighting element of the said rear panel to a backlit group grouping together a plurality of elementary sets of optical valves in the front panel.

Each elementary set corresponds to a pixel of an image to be displayed. Such devices with two modulation stages in series make it possible to increase appreciably the image display contrast (high dynamic range or HDR). In general, the backlighting elements are formed by light-emitting diodes, and the optical valves are generally of the liquid-crystal type. The documents U.S. Pat. No. 7,064,740 and WO02/079862 describe such a display device, as does the article entitled "A high Dynamic Range Display Using Low and High Resolution Modulators", published by Helge SEETZEN and Lorne A. WHITEHEAD, in the compendium of presentations given at the SID 2003 conference (para. 54.2, pp. 1450 to 1453).

The article entitled "Self-calibrating wide colour gamut high dynamic range display", published on 12 Feb. 2007 by Helge SEETZEN et al., in "Proceedings SPIE", vol. 6792 (XP002454790), describes means for compensating the chromatic drifts of backlighting light-emitting diodes of such display devices.

The invention is concerned, in particular, with a method for the display of images with the aid of such devices. In the abovementioned documents, only the luminance or emission intensity of the backlighting elements is adjusted according to the content of the images to be displayed.

One object of the invention is further to improve the image display contrast, also in comparison with the display methods described in the documents U.S. Pat. Nos. 7,012,382 and 6,608,614, where the backlighting elements are not distributed in a network and are not each coupled optically to a backlit group. In such display devices, each emitter of the backlighting elements is generally capable of emitting one of the said primary colours. If the image is displayed with the aid of three digitally primary colours, red, green and blue, each backlighting element generally comprises a red emitter, a green emitter and a blue emitter. Each optical valve of an elementary set of optical valves, that is to say of a pixel to be displayed, is capable of modulating a single primary colour, red, green or blue. It usually happens that the optical valve, which, for example, is capable of modulating the primary colour red, modulates the brightness not only of the light from the red emitter, but also partly the light from the green emitter and/or from the blue emitter of the same backlighting element. This situation arises, for example, when, as the optical valves are liquid-crystal cells provided with coloured optical filters, the optical valves provided with a coloured optical filter transmitting the primary colour red transmit not only the light emitted by the red emitters, but also, for example, the, albeit weak, red component of the light emitted by the green emitter or the blue emitter. These colour interferences (colour crosstalk) disturb the image display quality. One object of the invention is also to improve the image display quality.

For this purpose, a subject of the invention is a device for displaying images with the aid of various primary colours, comprising:
- a rear panel comprising a network of backlighting elements which have modulatable luminance,
- a front panel comprising a network of optical valves which are each capable of modulating the brightness of a single primary colour and which are distributed in the form of elementary sets of adjacent optical valves, where each elementary set comprises at least one optical valve for each of the said primary colours,
- and means for the optical coupling of each backlighting element of the said rear panel to a backlit group grouping together a plurality of elementary sets of optical valves of the front panel,
where the said backlighting elements likewise have modulatable chrominance.

The modulation of the brightness (or lightness) of a given colour by each optical valve makes it possible to modify the appearance of this colour, whether dull, dark or light. The term "luminance" may by extension likewise be adopted.

By the modulation of chrominance, which is added to the modulation of luminance for the backlighting elements of the rear panel, the device according to the invention makes it possible to display the images with even more contrast and better quality.

Preferably, the backlighting elements have modulatable chrominance at least in the whole of the range of colours which is delimited by the said primary colours.

Preferably, each backlighting element comprises at least one emitter for each of the said primary colours. Preferably, each emitter is capable of emitting one of the said primary colours.

Preferably, the said emitters are light-emitting diodes.

Preferably, each optical valve comprises a liquid-crystal cell for the said brightness modulation of this valve, and a coloured optical filter capable of transmitting the primary colour, the brightness of which this valve is capable of modulating.

Preferably, the said optical coupling means comprise a light diffuser panel itself comprising a rear diffusion layer, a front diffusion layer, and a transparent thick layer inserted between the said rear diffusion layer and the said front diffusion layer.

A subject of the invention is, in particular, a method for the display of at least one image with the aid of the device according to the invention, where each pixel of this image to be displayed corresponds to an elementary set of optical valves of the said front panel, in which method both the luminance and the chrominance of each backlighting element of the said rear panel are modulated as a function of the display data of the pixels of the said image which correspond to the elementary sets belonging to the same backlit group of the said front panel which is coupled optically to the said backlighting element. With the display of the images being carried out in this way by modulating not only the luminance, as in the prior art, but also the chrominance of the backlighting elements, the network of backlighting elements is utilized much more profitably, and also the contrast and, above all, the quality of display of the images are improved.

Preferably, for the image display, the brightness of each optical valve of the backlit group is likewise modulated as a function of the display datum of the pixel corresponding to the elementary set to which this valve belongs.

According to the invention, this display datum not only takes into account the primary colour, the brightness of which this valve is capable of modulating, but also the other primary colours.

Preferably, the brightness of each optical valve of the said backlit group is not only modulated as a function of the display datum of the pixel corresponding to the elementary set to which this valve belongs, but also as a function of the display datum of the pixels corresponding to the other elementary sets of the same backlit group. To be precise, the backlighting luminance and chrominance of each optical valve of a group backlit by a backlighting element depend on the display data of the pixels which correspond to all the elementary sets belonging to the same backlit group, not only on the display datum of the pixel corresponding to the elementary set to which this optical valve belongs. For the control of each optical valve, it is known that it is appropriate to take into account its backlighting, that is to say, here, indirectly, the display data of the pixels which correspond to all the elementary sets belonging to the same backlit group as this optical valve. This avoids the colour interferences which disturb the image display quality.

Preferably,
- each backlighting element comprising at least one emitter for each of the said primary colours, and each emitter being associated with an emission spectrum,
- each optical valve comprising a liquid-crystal cell for the said brightness modulation of this valve, and a coloured optical filter capable of transmitting the primary colour, the brightness of which this valve is capable of modulating, each coloured optical filter being associated with a transmission spectrum,
- each optical valve being associated with at least one emitter for the primary colour, the brightness of which the said valve is capable of modulating,
- and the transmission spectrum of the coloured filter of the said optical valve covering not only the emission spectrum of the said emitter, but also, at least partially, the emission spectrum of at least one other emitter of the same backlighting element for at least one other primary colour, the brightness of each optical valve of the said backlit group is likewise modulated not only as a function of the modulation of the at least one emitter associated with this optical valve, but also as a function of the modulation of the at least one other emitter of the same backlighting element.

In general, each emitter of a backlighting element is capable of emitting one of the said primary colours. If the image is displayed with the aid of three primary colours, red, green and blue, each backlighting element generally comprises an emitter for the primary colour red, an emitter for the primary colour green and an emitter for the primary colour blue. These emitters are generally controllable independently of one another in order to obtain a modulation of both the luminance and the chrominance of this backlighting element. Each optical valve of the backlit group coupled optically to this backlighting element modulates the brightness of one of the primary display colours as a function of the display datum of the pixel corresponding to the elementary set to which this valve belongs: an optical valve provided with a coloured optical filter transmitting the primary colour red transmits not only the light emitted by the emitter for the primary colour red of the backlighting element, but also, for example, the, albeit weak, red component of the light emitted by the emitter for the primary colour green of the same backlighting element if, in particular, the transmission spectrum of the coloured filter of this optical valve covers the emission spectrum of this emitter for the primary colour green.

It is inevitable that this optical valve will therefore modulate the brightness not only of the light emitted by the emitter for the primary colour red, but also, generally in a smaller proportion, the light emitted by the emitter for the primary colour green. According to the invention, in order to modulate the primary colour red afforded by this optical valve, not only is the modulated emission level of the emitter for the primary colour red taken into account, but also the modulated emission level of the emitter for the primary colour green. This avoids the colour interferences which disturb the image display quality.

According to a variant, one of the emitters can emit two primary colours: for example, if the image is displayed with the aid of three primary colours, red, green and blue, each backlighting element may comprise an emitter for the primary colour red, an emitter for the primary colour green, an emitter for the primary colour blue and a yellow emitter both for the primary colour red and for the primary colour green.

Preferably, for each elementary set corresponding to a pixel, the display datum of which is expressed by the colour vector $$\begin{bmatrix} X \\ Y \\ Z \end{bmatrix},$$

the brightness modulation factor $$\begin{bmatrix} R_{Mod} \\ G_{Mod} \\ B_{Mod} \end{bmatrix}$$

of each optical valve ($V_R$, $V_G$, $V_B$) of this elementary set conforms to the equation:

$$\begin{bmatrix} X \\ Y \\ Z \end{bmatrix} = \underset{3\times N}{xyz} \cdot \left( \underset{3\times N}{rgb^T} \begin{bmatrix} R_{LED} \\ G_{LED} \\ B_{LED} \end{bmatrix} \cdot {}^*\underset{3\times N}{rgb^T}_{Mod} \begin{bmatrix} R_{Mod} \\ G_{Mod} \\ B_{Mod} \end{bmatrix} \right),$$

where $$\begin{bmatrix} R_{LED} \\ G_{LED} \\ B_{LED} \end{bmatrix}$$

represents the luminance and chrominance modulation factors of the backlighting element coupled optically to the backlit group to which the said elementary set belongs, where $$\underset{3\times N}{xyz}\cdot$$

represents the matrix of the colorimetric functions of the reference primaries of the colour space in which the colour vectors are expressed, where $$\underset{3 \times N_{LED}}{rgb}$$

represents the emission spectra of the said backlighting element when all the modulation factors of this element are zero, except one, where $$\underset{3 \times N_{MOD}}{rgb}$$

represents the transmission spectra of the coloured filters of each valve ($V_R$, $V_G$, $V_B$) of different primary colours of the said same elementary set. The colorimetric functions are called the colour matching functions matrix. By virtue of the invention, each optical valve takes into account the set of primary colours emitted by the backlighting element to which it is coupled, not only the specific primary colour with which it is associated. This avoids the "interferences" between the emission spectra of the various diodes which would form the same backlighting element and the transmission spectra of the coloured optical filters of the optical valves of the same backlit group. This specific control mode thus makes it possible to avoid the "interferences" of the colour interferences which disturb the image display quality.

Figure 2:
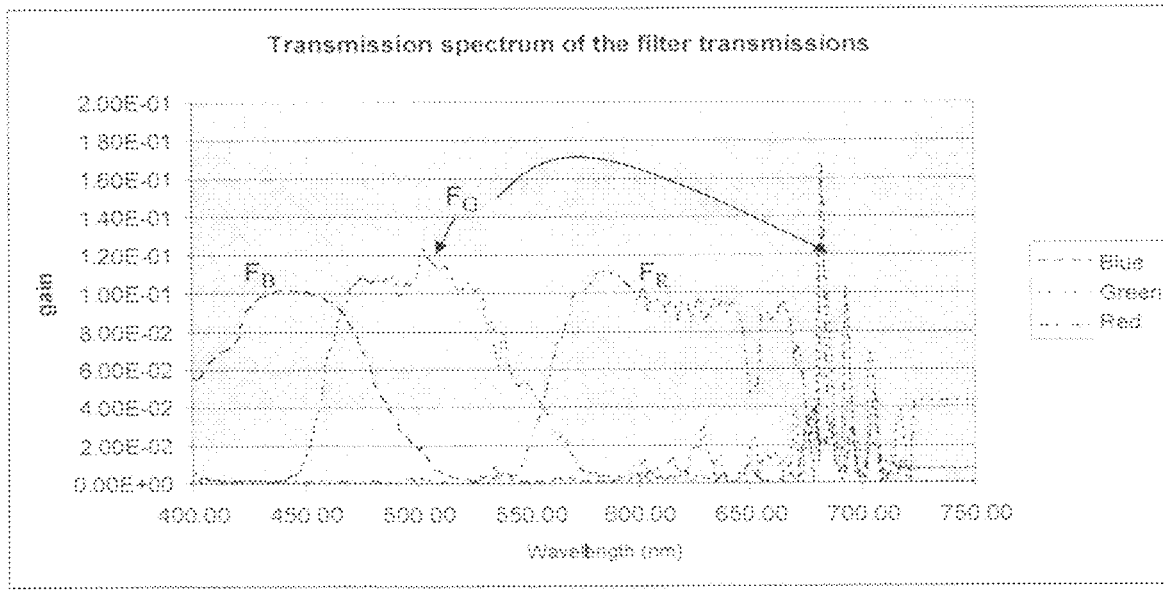
Figure 3:
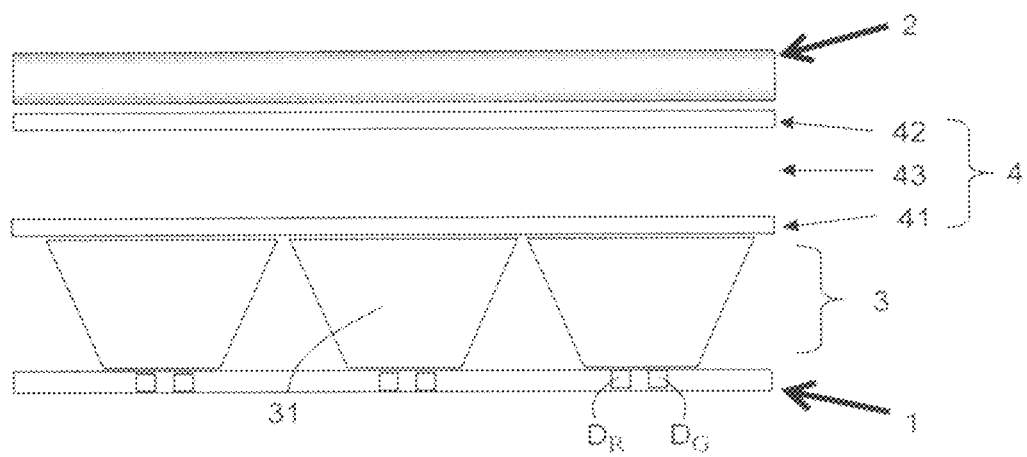

The invention will be understood more clearly from a reading of the following description given by way of non-limiting example, and with reference to the accompanying figures in which:

FIG. 1 gives the emission spectrum of the various diodes of a backlighting element of the display device according to the embodiment of the invention illustrated in FIG. 3;

FIG. 2 gives the transmission spectrum of the coloured filters of the various optical valves of an elementary display set of the display device according to the embodiment illustrated in FIG. 3;

FIG. 3 illustrates an embodiment of the display device according to the invention.

Referring to FIG. 3, a device for the display of images having three primary colours $P_R$, $P_G$, $P_B$ according to an embodiment of the invention will now be described. This device comprises:

a rear panel 1 comprising a network of backlighting elements which have modulatable luminance and chrominance; each backlighting element comprises three light-emitting diodes $D_R$, $D_G$, $D_B$ ($D_B$ not illustrated in FIG. 3), here a diode for each primary colour $P_R$, $P_G$, $P_B$, as described, for example, in the document EP1717633; referring to FIG. 1, the emission spectra of these light-emitting diodes $D_R$, $D_G$, $D_B$ as a function of the wavelength are represented by $$\underset{3 \times N_{LED}}{rgb},$$

where N is the number of wavelength sampling steps of these spectra; $R_{LED}$, $G_{LED}$, $B_{LED}$ refer to the respective modulation desired values of the diodes $D_R$, $D_G$, $D_B$ which make it possible to obtain a modulation both of the luminance and of the chrominance of the backlighting element;

a front panel 2 comprising a network of optical valves (not illustrated in FIG. 1); each optical valve comprises a liquid-crystal cell making it possible to modulate the brightness at the output of this valve and a coloured optical filter positioned at the input of this valve; these optical valves are distributed in the form of elementary sets of adjacent optical valves, such that each elementary display set comprises an optical valve $V_R$, $V_G$, $V_B$ for each primary colour $P_R$, $P_G$, $P_B$; referring to FIG. 2, the transmission spectra of the respective coloured filters $F_R$, $F_G$, $F_B$ of each valve $V_R$, $V_G$, $V_B$ of the same elementary display set are represented by $$\underset{3 \times N_{MOD}}{rgb},$$

where N is the number of wavelength sampling steps of these spectra; $R_{Mod}$, $G_{Mod}$, $B_{Mod}$ refer to the respective modulation desired values of the valves $V_R$, $V_G$, $V_B$ of the same elementary display set, which make it possible to obtain a modulation of only the brightness of the colour filtered respectively by the filters $F_R$, $F_G$, $F_B$;

means 3 for the optical coupling of each backlighting element of the rear panel 1 to a backlit group of the front panel 2 comprising a plurality of elementary sets of optical valves; such coupling means are described, for example, in the document WO03/077013 where use is made of cylindrical guides with reflecting walls forming a "honeycomb" structure between the rear panel 1 and the front panel 2; use is made here of conical light guides 31, as described for a different application in the document U.S. Pat. No. 5,839,823.

The optical coupling means likewise comprise here a light diffuser panel 4 comprising a rear diffusion layer 41, a front diffusion layer 42 and a transparent thick layer 43, generally a glass plate, inserted between the diffusion layers 41 and 42. The rear diffusion layer 41 serves for forming a secondary light source at the end of each light guide 31. By virtue of the front diffusion layer 42, the emitting surface seen by an observer of the images displayed by the device will advantageously appear very near to the front panel of optical valves, this being beneficial to the display quality. Finally, by virtue of the inserted transparent thick layer 43, the mix of the radiation emitted by the various diodes of the same backlighting element is improved, thereby improving the backlighting homogeneity.

The various components of the display device which have just been described are manufactured and assembled in a way known per se. One advantage of this display device is that each backlighting element can have its chrominance modulated at least in the whole of the range of colours which is delimited by the emission colours of the diodes of this element.

As can be seen by comparing FIGS. 1 and 2, the transmission spectrum of each of the coloured optical filters covers the emission spectra of at least two light-emitting diodes associated with different primary colours. It is these covers which, in particular, are responsible for the colour interference problems which the display method according to the invention solves.

A method for the display of images with the aid of the image display device which has just been described, according to an embodiment of the invention, will now be described.

Each pixel of an image to be displayed corresponds to an elementary display set of the front panel which, as described above, groups together adjacent optical valves $V_R$, $V_G$, $V_B$ of different primary colours which can be modulated respectively according to the desired values $R_{Mod}$, $G_{Mod}$, $B_{Mod}$.

Conventionally, each pixel is coded in the form of a colour vector $$\begin{bmatrix} X \\ Y \\ Z \end{bmatrix}$$

in a given colour space XYZ; the colorimetric spectral functions of the reference primaries of this space are grouped together in the form of a matrix $$\underset{3 \times N}{xyz},$$

where N is the number of wavelength sampling steps of these functions.

If the display data are available only in a conventional format, called "RGB", these data can conventionally be converted into a format called "XYZ" independent of any device, according to the conventional formula:

$$\begin{bmatrix} X_C \\ Y_C \\ Z_C \end{bmatrix} = M_{XYZ}^{-1} \begin{bmatrix} R_C \\ G_C \\ B_C \end{bmatrix}, \text{ where}$$

$$M_{XYZ} = \begin{pmatrix} 3.240479 & -1.5377150 & -0.498535 \\ -0.969256 & 1.875992 & 0.041556 \\ 0.055648 & -0.204043 & 1.057311 \end{pmatrix}$$

and where white is the and where white is the conventional illuminant D65.

According to the invention, in order to display each image, by applying the modulation desired values $R_{LED}$, $G_{LED}$, $B_{LED}$ respectively to the diodes $D_R$, $D_G$, $D_B$ of each backlighting element of the rear panel, both the luminance and the chrominance of each backlighting element of the rear panel are modulated as a function of the colour vectors $$\begin{bmatrix} X \\ Y \\ Z \end{bmatrix}$$

of the pixels of this image which correspond to the elementary display sets belonging to the same backlit group of the front panel which is coupled optically to this backlighting element. In order to obtain the modulation desired values $R_{LED}$, $G_{LED}$, $B_{LED}$ which determine the colour emitted by each backlighting element, the following operations are typically carried out:
  low-pass spatial filtration of the image to be displayed;
  resampling of the image at a resolution corresponding to the dimensions of the backlighting elements;
  optionally, spatial deconvolution in order to limit the "halo" effects attributable to the diodes.

Simultaneously, by applying the respective modulation desired values $R_{Mod}$, $G_{Mod}$, $B_{Mod}$ to the valves $V_R$, $V_G$, $V_B$ of each elementary display set of this same backlit group, only the brightness is modulated of the colour then emitted by this backlighting element and filtered by the filters $F_R$, $F_G$, $F_B$ of the valves $V_R$, $V_G$, $V_B$ of this elementary display set.

As described in more detail below, the display of the images is ensured such that, for each elementary display set corresponding to a pixel, the image datum of which is expressed by the colour vector $$\begin{bmatrix} X \\ Y \\ Z \end{bmatrix},$$

the brightness modulation factor $$\begin{bmatrix} R_{Mod} \\ G_{Mod} \\ B_{Mod} \end{bmatrix}$$

of each optical valve ($V_R$, $V_G$, $V_B$) of this elementary display set conforms to the equation:

$$\begin{bmatrix} X \\ Y \\ Z \end{bmatrix} = \underset{3 \times N}{xyz} \cdot \left( \underset{3 \times N_{LED}}{rgb^T} \begin{bmatrix} R_{LED} \\ G_{LED} \\ B_{LED} \end{bmatrix} \cdot * \underset{3 \times N_{Mod}}{rgb^T} \begin{bmatrix} R_{Mod} \\ G_{Mod} \\ B_{Mod} \end{bmatrix} \right).$$

To solve this equation and determine the values of $R_{Mod}$, $G_{Mod}$, $B_{Mod}$, the following procedure, for example with successive iterations, is carried out:
  1) an initial value $$\begin{bmatrix} R_{Mod} \\ G_{Mod} \\ B_{Mod} \end{bmatrix} := \begin{bmatrix} R_{LED} \\ G_{LED} \\ B_{LED} \end{bmatrix}$$

is adopted;
  2)

$$\begin{bmatrix} X' \\ Y' \\ Z' \end{bmatrix} = \underset{3 \times N}{xyz} \cdot \left( \underset{3 \times N_{LED}}{rgb^T} \begin{bmatrix} R_{LED} \\ G_{LED} \\ B_{LED} \end{bmatrix} \cdot * \underset{3 \times N_{Mod}}{rgb^T} \begin{bmatrix} R_{Mod} \\ G_{Mod} \\ B_{Mod} \end{bmatrix} \right)$$

is then calculated,
  3) the deviation $$\Delta = \text{Abs}\left( \begin{bmatrix} X' \\ Y' \\ Z' \end{bmatrix} - \begin{bmatrix} X \\ Y \\ Z \end{bmatrix} \right)$$

is deduced from this,
  and there is a return to step 1) above with a new value $$\begin{bmatrix} R_{Mod} \\ G_{Mod} \\ B_{Mod} \end{bmatrix} := \begin{bmatrix} R_{Mod} \\ G_{Mod} \\ B_{Mod} \end{bmatrix} \cdot * \left( \begin{bmatrix} X \\ Y \\ Z \end{bmatrix} \cdot / \begin{bmatrix} X' \\ Y' \\ Z' \end{bmatrix} \right).$$

Operations 1) to 3) are repeated until the deviation Δ is below a predetermined threshold.

By carrying out the display of the images in this way by modulating both the luminance, as in the prior art, and also the chrominance of the backlighting elements, the network of backlighting elements of the rear panel 1 is utilized much more profitably, and the contrast and, above all, quality of display of the images are also improved.

The display quality is improved because, in particular, the modulation of each valve not only takes into account the primary colour, the brightness of which this valve is capable of modulating, but also the other primary colours, thus making it possible to avoid the colour interferences.

The present invention has been described with reference to a rear backlighting panel based on light-emitting diodes; it is clear to a person skilled in the art that it may apply to other types of emitters, without departing from the scope of the following claims.

The present invention has been described with reference to a front panel of optical valves based on liquid crystals; it is clear to a person skilled in the art that it may apply to other types of optical valves, without departing from the scope of the following claims.

The invention claimed is:

1. A method of displaying at least one image, the method comprising:
   modulating luminance and chrominance of a network of backlighting elements associated with a rear panel of a display, wherein the modulating of the luminance and chrominance is a function of display data corresponding to pixels of an image, the luminance and chrominance modulated backlighting elements each generating primary colors;
   optically coupling of each of the backlighting elements of the rear panel to a group of a plurality of elementary sets of optical valves associated with a front panel, wherein each of the elementary sets of optical valves includes one optical valve for each of the primary colors, wherein each of the elementary sets of optical valves displays a pixel of the image; and
   modulating, using each of the optical valves of the group, a brightness associated with each of the generated primary colors received from each of the backlighting elements;
   wherein modulating the brightness of each optical valve of the group is a function of display datum associated with a pixel of the image corresponding to an elementary set of the group to which the optical valve belongs, and
   wherein the brightness of each of the optical valves of the group is modulated as a function of display datum associated with a pixel of the image corresponding to other elementary sets within the group.

2. The method of claim 1, wherein the brightness of each of the optical valves of the group is further modulated as a function of display datum associated with a pixel of the image corresponding to at least one other elementary set than the elementary set of the group to which the optical valve belongs.

3. The method of claim 1, wherein each backlighting element comprises one emitter for each of the generated primary colors.

4. The method of claim 1, wherein a brightness modulation factor $$\begin{bmatrix} R_{Mod} \\ G_{Mod} \\ B_{Mod} \end{bmatrix}$$

of each of the optical valves of the group conforms to $$\begin{bmatrix} X \\ Y \\ Z \end{bmatrix} = \underset{3 \times N}{xyz} \cdot \left( \underset{3 \times N_{LED}}{rgb^T} \begin{bmatrix} R_{LED} \\ G_{LED} \\ B_{LED} \end{bmatrix} \cdot * \underset{3 \times N_{Mod}}{rgb^T} \begin{bmatrix} R_{Mod} \\ G_{Mod} \\ B_{Mod} \end{bmatrix} \right),$$

where $$\begin{bmatrix} X \\ Y \\ Z \end{bmatrix},$$

represents a color vector of the display datum associated with a pixel of the image,
where $$\begin{bmatrix} R_{LED} \\ G_{LED} \\ B_{LED} \end{bmatrix}$$

represents luminance and chrominance modulation factors of the backlighting element optically coupled to a group of a plurality of elementary sets of optical valves associated with the pixel,
where $$\underset{3 \times N}{xyz} \cdot$$

represents a matrix of colorimetric functions of reference primaries of a color space in which the color vector is expressed,
where $$\underset{3 \times N_{LED}}{rgb}$$

represents an emission spectra of the backlighting element when all the modulation factors of this element are zero, except one,
where $$\underset{3 \times N_{MOD}}{rgb}$$

represents a transmission spectra of the optical valve for each of the primary colors of the elementary set of optical valves.

5. The method of claim 1, wherein each backlighting element comprises one emitter generating one primary color or a combination of primary colors.

6. A display device comprising:
- a rear panel comprising a network of backlighting elements that each have modulable luminance and chrominance, wherein modulating of the luminance and chrominance is a function of display data corresponding to pixels of an image, wherein the luminance and chrominance modulated backlighting elements each generate primary colors;
- a front panel comprising a group of a plurality of elementary sets of optical valves, wherein each of the elementary sets of optical valves includes one optical valve for each of the primary colors, each of the elementary sets of optical valves displaying a pixel of the image, each of the optical valves of the group modulating a brightness associated with each of the generated primary colors received from each of the backlighting elements; and
- wherein each of the backlighting elements of the rear panel is optically coupled to a group of a plurality of elementary sets of optical valves associated with the front panel;
- wherein each optical valve of the group modulates the brightness as a function of display datum associated with a pixel of the image corresponding the elementary set of the group to which the optical valve belongs; and
- wherein each of the optical valves of the group modulates the brightness as a function of display datum associated with a pixel of the image corresponding to other elementary sets within the group.

7. The display device according to claim 6, wherein each optical valve comprises a liquid-crystal cell for modulating the brightness, and a colored optical filter capable of transmitting the generated primary color received from each of the backlighting elements optically coupled to the group to which the optical valve belongs, wherein each colored optical filter is associated with a transmission spectrum.

8. The display device according to claim 7, wherein each backlighting element comprises one emitter for each of the generated primary colors, wherein each emitter is associated with an emission spectrum;
- wherein each optical valve is associated with one emitter for the primary color; and wherein the transmission spectrum of the colored filter of the optical valve covers the emission spectrum of the emitter of a generated primary color and, at least partially, the emission spectrum of at least one other emitter of the same backlighting element for at least one other generated primary color.

9. The display device according to claim 8, wherein the emitters are light-emitting diodes.

10. The display device according to claim 7, wherein each backlighting element comprises one emitter generating one primary color or a combination of primary colors; wherein the emitter is associated with an emission spectrum; and wherein the transmission spectrum of the colored filter of the optical valve covers the emission spectrum of the emitter generating one primary color or a combination of primary colors.

11. The display device according to claim 10, wherein the emitter is a light-emitting diode.

12. The display device according to claim 6, wherein the backlighting elements have modulable chrominance at least in a whole of a range of colors that is delimited by the generated primary colors.

13. The display device according to claim 6, further comprising a light diffuser panel comprising a rear diffusion layer, a front diffusion layer, and a transparent thick layer inserted between the rear diffusion layer and the front diffusion layer, wherein the light diffuser panel optically couples the backlighting elements to the group of the plurality of elementary sets of optical valves.

\* \* \* \* \*